(12) United States Patent
Huang et al.

(10) Patent No.: US 12,541,078 B2
(45) Date of Patent: Feb. 3, 2026

(54) IMAGING LENS

(71) Applicant: Young Optics Inc., Hsinchu Science Park (TW)

(72) Inventors: Han-Ting Huang, Hsinchu Science Park (TW); Chi-Yu Bai, Hsinchu Science Park (TW); Ching-Lung Lai, Hsinchu Science Park (TW)

(73) Assignee: YOUNG OPTICS INC., Hsinchu Science Park (TW)

( * ) Notice: Subject to any disclaimer, the term of this patent is extended or adjusted under 35 U.S.C. 154(b) by 379 days.

(21) Appl. No.: 18/295,693

(22) Filed: Apr. 4, 2023

(65) Prior Publication Data

US 2024/0241344 A1    Jul. 18, 2024

(30) Foreign Application Priority Data

Jan. 16, 2023  (TW) ................................. 112101815

(51) Int. Cl.
*G02B 9/10*      (2006.01)
*G02B 13/00*     (2006.01)

(52) U.S. Cl.
CPC ............. *G02B 9/10* (2013.01); *G02B 13/004* (2013.01); *G02B 13/0045* (2013.01)

(58) Field of Classification Search
CPC ..... G02B 9/10; G02B 13/004; G02B 13/0045
USPC ........................................................ 359/717
See application file for complete search history.

(56) References Cited

FOREIGN PATENT DOCUMENTS

CN          111323893 A   *   6/2020   ......... G02B 13/0045

* cited by examiner

*Primary Examiner* — William Choi
(74) *Attorney, Agent, or Firm* — MUNCY, GEISSLER, OLDS & LOWE, P.C.

(57) ABSTRACT

An imaging lens including a first lens group, a second lens group, and an aperture stop disposed between the first lens group and the second lens group is provided. The first lens group includes at least one and at most three lenses with refractive powers, and the second lens group has a positive refractive power and includes at least two and at most three lenses with a refractive powers. The imaging lens satisfies conditions of 2 mm<LT<20 mm and 0.8<D1/LT<1.4, where D1 is a lens diameter of the lens closest to the object side, and LT is distance along the optical axis between two outermost lens surfaces at opposite ends of the first lens group and the second lens group.

20 Claims, 9 Drawing Sheets

IMAGING LENS

BACKGROUND OF THE INVENTION a. Field of the Invention

The invention relates to an optical lens, and, more particularly, to an imaging lens.

b. Description of the Related Art

Recent advances in technology have led to the development of various types of imaging lenses. For example, an imaging lens used in access controls, surveillance cameras, in-vehicle cameras or action cameras is a commonly used optical lens. Nowadays, there is a growing need for an imaging lens to be miniaturized and have high optical performance and a wide field of view.

However, the conventional wide-angle imaging lens is limited by the shape and material of lenses, thus making it difficult to be miniaturized and failing to achieve high imaging quality under a wide field of view.

BRIEF SUMMARY OF THE INVENTION

The invention provides an imaging lens that may achieve wide viewing angles, high imaging quality and miniaturization, and may particularly meet the requirements of surveillance cameras.

According to one aspect of the present disclosure, an imaging lens includes a first lens group, a second lens group and an aperture stop disposed between the first lens group and the second lens group. The first lens group includes at least one and at most three lenses with refractive powers, and the second lens group has a positive refractive power and includes at least two and at most three lenses with a refractive powers. A lens closest to an object side in the first lens group is made of glass, and the imaging lens satisfies conditions of 2 mm<LT<20 mm and 0.8<D1/LT<1.4, where D1 is a lens diameter of the lens closest to the object side, and LT is distance along the optical axis between two outermost lens surfaces at opposite ends of the first lens group and the second lens group.

According to another aspect of the present disclosure, an imaging lens includes a first lens, a second lens, a third lens, and a fourth lens with refractive powers arranged in order from an object side to an image side. An aperture stop is disposed between the first lens and the second lens, and an infrared filter is disposed on one side of the fourth lens away from the first lens and capable of blocking more than 97% of light within a wavelength range of 690 nm to 750 nm. The first lens is made of glass, and the imaging lens satisfies conditions of 2 mm<LT<20 mm, 0.8<D1/LT<1.4 and 0.6<DL/LT<1, where D1 is a lens diameter of the first lens, DL is a lens diameter of the fourth lens, and LT is distance along the optical axis between an object-side surface of the first lens and an image-side surface of the fourth lens.

In accordance with the above aspects, meeting the designed characteristics and arrangement of optical components set forth in the above may achieve good imaging quality, 24-hours confocal image-capturing capability and a miniaturized assembly under the condition of a wide field of view and a large effective aperture. Further, in various embodiments of the invention, the glass/plastic lenses and spherical/aspheric lenses are well matched to achieve a wide range of operating temperature, low fabrication costs and improved imaging quality.

Other objectives, features and advantages of the invention will be further understood from the further technological features disclosed by the embodiments of the invention wherein there are shown and described preferred embodiments of this invention, simply by way of illustration of modes best suited to carry out the invention.

DETAILED DESCRIPTION OF THE INVENTION

In the following detailed description of the preferred embodiments, directional terminology, such as "top," "bottom," "front." "back," etc., is used with reference to the orientation of the Figure(s) being described. The components of the invention can be positioned in a number of different orientations. As such, the directional terminology is used for purposes of illustration and is in no way limiting. Further, "First." "Second," etc., as used herein, are used as labels for nouns that they precede, and do not imply any type of ordering (e.g., spatial, temporal, logical, etc.).

Figure 1:
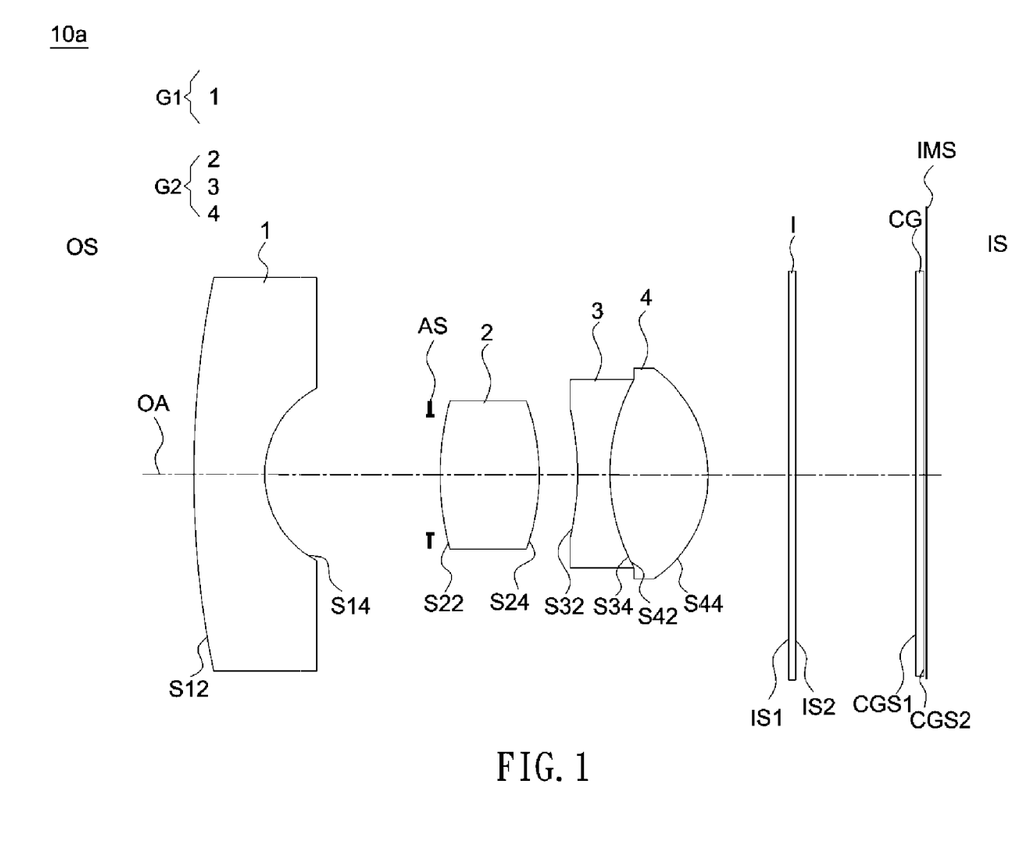
FIG. 1 is a schematic diagram of an imaging lens according to a first embodiment of the invention.

FIG. 1 is a schematic diagram of an imaging lens according to a first embodiment of the invention. Referring to FIG. 1, an imaging lens 10a includes, in order from an object side OS to an image side IS, a first lens 1 (the first lens 1 constituting a first lens group G1), a second lens 2, a third lens 3, a fourth lens 4 (the second lens 2, the third lens 3 and the fourth lens 4 constituting a second lens group G2), an infrared filter I, a cover plate CG, and an aperture stop AS located between the first lens 1 and the second lens 2. Each of the first lens 1, the second lens 2, the third lens 3, and the fourth lens 4 has a refractive power. The aperture stop AS is a light-blocking element that limits the amount of light passing through the imaging lens 10a. In other embodiment, the aperture stop AS is defined by an inner diameter of a lens barrel and thus is not an independent optical element. Light from a subject to be captured may enter the imaging lens 10a and pass through the first lens 1, the aperture stop AS, the second lens 2, the third lens 3, the fourth lens 4, the infrared filter I and the cover plate CG in succession, and finally forms an image on an image plane IMS. The object side OS is the side provided with the subject to be captured, and the image-side IS is the side provided with the image plane IMS.

In this embodiment, the first lens 1, the second lens 2, the third lens 3, the fourth lens 4, the infrared filter I and the cover plate CG respectively have object-side surfaces S12 and S22, S32, S42, IS1, CGS1 facing the object side OS and allowing imaging light beams to pass therethrough, and the first lens 1, the second lens 2, the third lens 3, the fourth lens 4, the infrared filter I and the cover plate CG respectively have image-side surfaces S14, S24, S34, S44, IS2, CGS2 facing the image side IS and allowing imaging light beams to pass therethrough.

In detail, the first lens 1 is a glass spherical lens. The first lens 1 has a negative refractive power and is a meniscus lens, where the object-side surface S12 is convex, and the image-side surface S14 is concave. The object-side surface S12 and the image-side surface S14 of the first lens 1 are spherical surfaces, but the invention is not limited thereto.

The second lens 2 is a glass spherical lens. The second lens 2 has a positive refractive power. The object-side surface S22 and the image-side surface S24 of the second lens 2 are spherical surfaces, but the invention is not limited thereto.

The third lens 3 is a plastic aspheric lens. The third lens 3 has a negative refractive power. The object-side surface S32 and the image-side surface S34 of the third lens 3 are aspheric surfaces, but the invention is not limited thereto.

The fourth lens 4 is a plastic aspheric lens. The fourth lens 4 has a positive refractive power. The object-side surface S42 and the image-side surface S44 of the fourth lens 4 are aspheric surfaces. In this embodiment, the image-side surface S34 of the third lens 3 and the object-side surface S42 of the fourth lens 4 are connected with each other to form a compound lens, such as being cemented to each other to form a cemented lens, but the invention is not limited thereto.

The infrared filter I, which is disposed on one side of the second lens group G2 away from the first lens group G1, may pass the light within a wavelength range of about 360 nm to 689 nm (visible light) and block more than 97% of the light within a wavelength range of 690 nm to 750 nm. Specifically, infrared filter I may be included in an IR-Cut filter switcher that can be automatically switched. When visible light is sufficient, the infrared filter I blocks more than 97% of the light within a wavelength range of 690 nm to 750 nm; in contrast, when visible light is insufficient, the infrared filter I is deactivated to allow the light within a wavelength range of 690 nm to 750 nm to pass through.

The cover plate CG may be a plate made of any suitable light-transmissive material, such as glass. The cover plate CG may function to adjust the optical path length and protect the imaging lens.

In this embodiment, the imaging lens 10a consists essentially of four lenses with refractive powers. In the first embodiment of the imaging lens 10a, an effective focal length (EFL) is 2.76 mm, an F-number (F #) is 2.0, a diagonal field of view (DFOV) is 128.8 degrees, a total track length (TTL) is 18.51 mm, and a maximum image height is 2.92 mm. The total track length is the distance measure along the optical axis OA from the object-side surface S12 of the first lens 1 to the image plane IMS of the imaging lens 10a.

In this embodiment, a lens diameter (outer diameter) D1 of the first lens 1 is 15.51 mm, a lens diameter DL of the fourth lens 4 is 10.97 mm, and an overall lens length LT is 13.09 mm, where the overall lens length is the distance measure along the optical axis OA between two outermost lens surfaces at opposite ends of the optical lens (e.g., between the object-side surface S12 of the first lens 1 and the image-side surface S44 of the fourth lens 4). Therefore, D1/LT=1.18, DL/LT=0.84 and EFL/LT=0.21. In one embodiment, the lens diameter is a mechanical diameter that equals a distance between opposite turning points measured in a direction perpendicular to the optical axis OA, and the lens diameter may include the span covering a clear aperture (CA) that is required for all light to pass through the field of view plus the length of an extension part that is embedded in a barrel wall at two ends for mounting the lens on a lens barrel.

Detailed optical data of the imaging lens 10a are shown in Table 1 below. In Table 1, the column with a heading "Interval/Thickness" lists each distance between two adjacent optical surfaces, which indicates a thickness of each lens or optical element on the optical axis OA or a distance along the optical axis OA between two adjacent lenses or optical elements. For example, a cell of the row with a heading "S12" intersected with the column with a heading "Interval/Thickness" shows a thickness of the first lens 1 on the optical axis OA, and a cell of the row with a heading "S14" intersected with the column with a heading "Interval/Thickness" shows a distance along the optical axis OA between the first lens 1 and adjacent second lens 2. The column with a heading "Radius" lists the radius of each surface of the optical component. For example, a cell of the row with a heading "S12" intersected with the column with a heading "Radius" shows half of a diameter of the object-side surface S12 of the first lens 1, a cell of the row with a heading "S14" intersected with the column with a heading "Radius" shows half of a diameter of the image-side surface S14 of the first lens 1, and so on. The column with a heading "Shape" marks each lens surface as either spherical or aspherical. In addition, the column with a heading "Object" notes corresponding names of optical components. The above explanation about table headings also applies to other embodiments, thus not repeatedly described in the following for brevity.

TABLE 1

|  | Material | Shape | Radius (mm) | Interval/Thickness (mm) | Refractive index | Abbe number | semi-aperture (mm) | Object |
| --- | --- | --- | --- | --- | --- | --- | --- | --- |
| S12 | glass | spherical | 27.01 | 1.66 | 1.75 | 52 | 4.58 | first lens |
| S14 |  | spherical | 2.57 | 4.64 |  |  | 2.32 |  |
| AS |  |  |  |  |  |  | 1.55 | aperture stop |
| S22 | glass | spherical | 12.36 | 2.43 | 1.9 | 31 | 1.57 | second |
| S24 |  | spherical | −5.88 | 1.03 |  |  | 1.70 | lens |
| S32 | plastic | aspheric | −12.12 | 0.79 | 1.66 | 20 | 1.69 | third lens |
| S34 |  | aspheric | 2.65 | 0.01 |  |  | 2.15 |  |
| S42 | plastic | aspheric | 2.65 | 2.53 | 1.54 | 56 | 2.16 | fourth |

TABLE 1-continued

| | Material | Shape | Radius (mm) | Interval/ Thickness (mm) | Refractive index | Abbe number | semi-aperture (mm) | Object |
|---|---|---|---|---|---|---|---|---|
| S44 | | aspheric | −3.23 | 2.04 | | | 2.48 | lens |
| IS1 | | | | 0.30 | | | 4.73 | infrared |
| IS2 | | | | 2.73 | | | 4.73 | filter |
| CGS1 | | | | 0.30 | | | 4.73 | cover |
| CGS2 | | | | 0.04 | | | 4.73 | plate |
| IMS | | | | 0.00 | | | 3.16 | image plane |

In this embodiment, the object-side surface S32 of the third lens 3, the image-side surface S34 of the third lens 3, and the object side of the fourth lens 4 S42 and the image-side surface S44 of the fourth lens 4 are aspheric surfaces, and these aspheric surfaces are defined according to the following equation:

$$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \quad \quad (1)$$

Where:
R: a radius of curvature of part aspheric surface near the optical axis OA;
Y: a vertical distance from the point on the aspheric surface to the optical axis OA;
Z: a sag of the aspheric surface (a relative distance between a point on the aspheric surface spaced at a distance Y from the optical axis and the tangential plane at the aspheric surface vertex on the optical axis OA)
K: the conic coefficient; and
$a_{2i}$: the 2i-th aspheric coefficient.

Table 2 shows aspheric surface data including the conic coefficient and 2i-th order aspheric coefficients of each aspheric surface defines in the above equation. In Table 2, the field heading "S32" indicates the conic coefficient and aspheric coefficients of the object-side surface S32 of the third lens 3, and so on. In various embodiments of the invention, the 2nd order aspheric coefficient (a2) of each aspheric surface defined in Equation (1) is 0.

TABLE 2

| | K | a4 | a6 | a8 | a10 | a12 | a14 | a16 |
|---|---|---|---|---|---|---|---|---|
| S32 | 0 | −1.07E−02 | −1.40E−04 | −4.62E−05 | −6.52E−06 | 0 | 0 | 0 |
| S34 | −4.10 | 2.96E−03 | −1.82E−03 | 3.23E−04 | −3.52E−05 | 9.51E−07 | −4.89E−08 | 0 |
| S42 | −4.10 | 2.96E−03 | −1.82E−03 | 3.23E−04 | −3.52E−05 | 9.51E−07 | −4.89E−08 | 0 |
| S44 | −0.62 | −1.01E−03 | −2.88E−04 | 3.31E−05 | 1.28E−06 | −1.51E−06 | −1.51E−07 | 0 |

According to the above, the imaging lens 10a meets the following conditions: the first lens 1 and the second lens 2 are glass spherical lenses, and the third lens 3 and the fourth lens 4 are aspheric plastic lenses. The refractive power of the first lens 1 is negative, the refractive power of the second lens 2 is positive, the refractive power of the third lens 3 is negative, and the refractive power of the fourth lens 4 is positive. The diagonal field of view of the imaging lens 10a is between 120 and 140 degrees, and preferably between 125 and 130 degrees. In this embodiment, the diagonal field of view of the imaging lens 10a is 128.8 degrees.

The imaging lens 10a according to the above embodiment has at least the following advantages. First, the first lens 1 and the second lens 2 are both glass lenses with high light transmittance to improve imaging quality and with high hardness to enhance wear resistance. Besides, the relatively low thermal expansion coefficient of a glass lens is allowed to reduce thermal drift of the imaging lens 10a and thus enhance imaging quality. In addition, the third lens 3 and the fourth lens 4 are made of plastic to reduce manufacturing costs of the imaging lens 10a, and the imaging lens 10a includes two aspheric lenses to improve imaging resolution. Besides, the third lens 3 and the fourth lens 4 are cemented to form a cemented lens to correct chromatic aberrations and achieve higher manufacturing tolerances to thereby increase production yields.

In this embodiment, the imaging lens 10a may satisfy at least one of the following conditions: 2 mm<LT<20 mm, 0.8<D1/LT<1.4, 0.6<DL/LT<1 and 0.14<EFL/LT<0.4, where D1 is a lens diameter of the object-side surface of the first lens 1, LT is a distance measure along the optical axis OA between two outermost lens surfaces at opposite ends of the optical lens (e.g., between the object-side surface S12 of the first lens 1 and the image-side surface S44 of the fourth lens 4), EFL is an effective focal length of the imaging lens 10a, and DL is a lens diameter of the image-surface of the lens with a refractive power closest to the image side (i.e., the fourth lens 4).

In other aspect, the imaging lens 10a according to the above embodiment includes a first lens group G1 and a second lens group G2. The first lens group G1 includes one lens with a refractive power, and the second lens group G2 includes three lenses with refractive powers. In detail, the first lens group G1 includes a first lens 1 with a refractive power, and the second lens group G2 includes a second lens 2, a third lens 3. The aperture stop AS of the imaging lens 10a is disposed between the first lens group G1 and the second lens group G2. Moreover, the imaging lens 10a also meets the following conditions. The first lens group G1 includes a glass spherical lens with a negative refractive power (i.e., the first lens 1), and the outermost lens surface of the first lens group G1 towards the object side OS (i.e., the object-side surface S12 of the first lens 1) is spherical, the second lens group G2 includes two aspheric lenses (the third lens 3 with a negative refractive power and the fourth lens 4 with a positive refractive power), and the second lens group G2 has a cemented interface (cemented by the image-side surface S34 of third lens 3 and the object-side surface S42 of fourth lens 4). The overall refractive power of the second lens group G2 is positive.

Further, in this embodiment, the imaging lens 10a may also satisfy at least one of the following conditions: 2 mm<LT<20 mm, 0.8<D1/LT<1.4, 0.6<DL/LT<1, and 0.14<EFL/LT<0.4.

The detailed numerical values of optical data of the imaging lens 10a are summarized in Table 9.

Figure 2A:
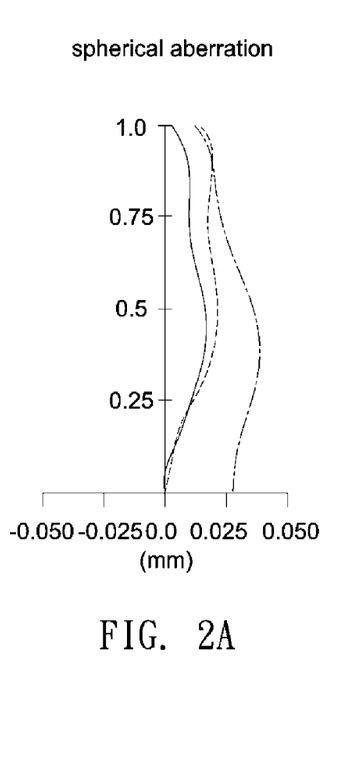
FIGS. 2A, 2B and 2C show longitudinal spherical aberration curves, astigmatic field curves and a distortion curve of the imaging lens illustrated in FIG. 1.
Figure 2B:
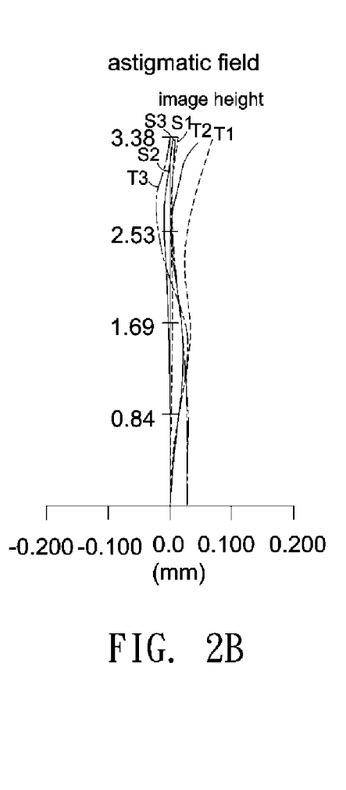
Figure 2C:
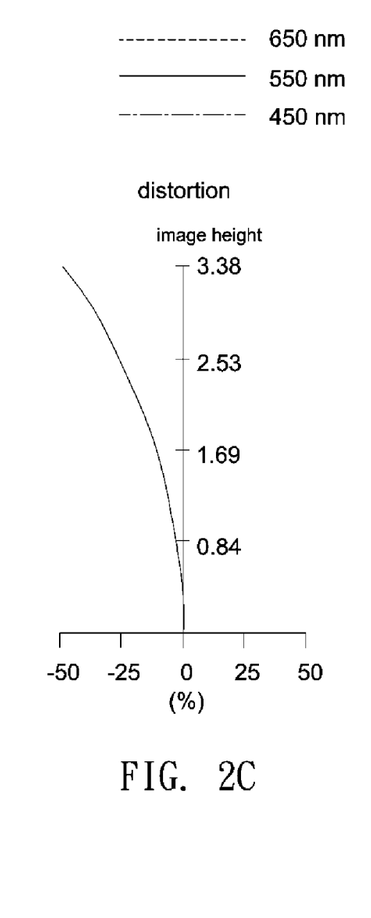

FIGS. 2A, 2B and 2C show longitudinal spherical aberration curves, astigmatic field curves and a distortion curve of the imaging lens 10a measured at wavelengths of 450 nm, 550 nm, and 650 nm. FIG. 2A shows the field curvature aberration measured at these wavelengths falls within ±0.05 mm over the entire field of view. FIG. 2B shows the field curvature aberration measured at these wavelengths falls within ±0.2 mm over the entire image height. Therefore, the imaging lens 10a having wide viewing angles (DFOV=128.8 degrees), a large aperture (F-number=2.0), and a total track length of 18.51 mm may still provide good imaging quality.

Figure 3:
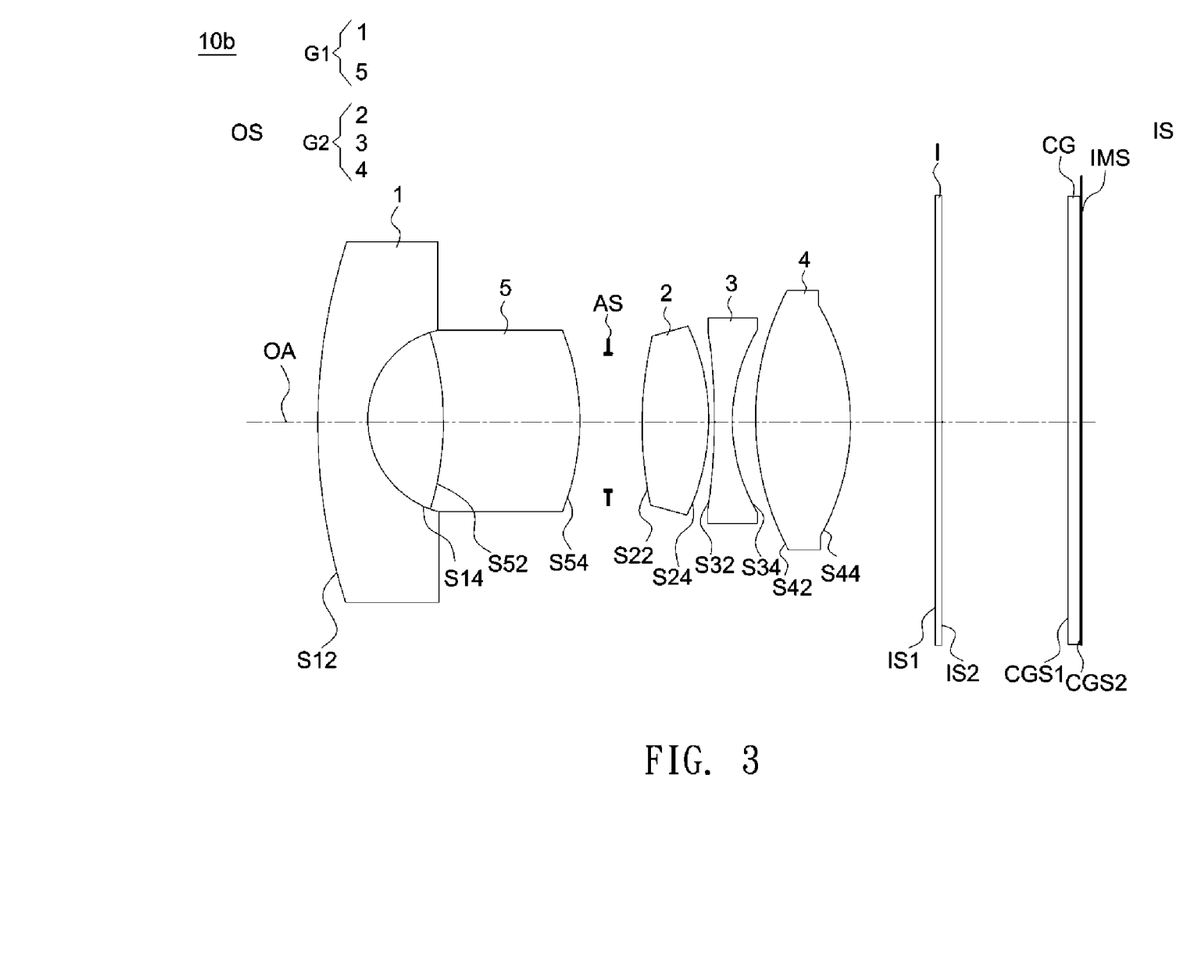
FIG. 3 is a schematic diagram of an imaging lens according to a second embodiment of the invention.

FIG. 3 is a schematic diagram of an imaging lens according to a second embodiment of the invention.

Referring to FIG. 3, an imaging lens 10b includes, in order from an object side OS to an image side IS, a first lens 1 and a fifth lens 5 (the first lens 1 and the fifth lens 5 constituting a first lens group G1), a second lens 2, a third lens 3, a fourth lens 4 (the second lens 2, the third lens 3 and the fourth lens 4 constituting a second lens group G2), an infrared filter I, a cover plate CG, and an aperture stop AS located between the first lens 1 and the second lens 2.

In this embodiment, the first lens 1, the fifth lens 5, the second lens 2, the third lens 3, the fourth lens 4, the infrared filter I and the cover plate CG respectively have object-side surfaces S12, S52, S22, S32, S42, IS1, CGS1 facing the object side OS and allowing imaging light beams to pass therethrough, and the first lens 1, the fifth lens 5, the second lens 2, the third lens 3, the fourth lens 4, the infrared filter I and the cover plate CG respectively have image-side surfaces S14, S54, S24, S34, S44, IS2, CGS2 facing the image side IS and allowing imaging light beams to pass therethrough.

In detail, in this embodiment, the first lens 1 is a glass spherical lens. The first lens 1 has a negative refractive power and is a meniscus lens, where the object-side surface S12 is convex, and the image-side surface S14 is concave. The object-side surface S12 and the image-side surface S14 of the first lens 1 are spherical surfaces, but the invention is not limited thereto.

The second lens 2 is a glass spherical lens. The second lens 2 has a positive refractive power. The object-side surface S22 and the image-side surface S24 of the second lens 2 are spherical surfaces, but the invention is not limited thereto.

The third lens 3 is a plastic aspheric lens. The third lens 3 has a negative refractive power. The object-side surface S32 and the image-side surface S34 of the third lens 3 are aspheric surfaces, but the invention is not limited thereto.

The fourth lens 4 is a plastic aspheric lens. The fourth lens 4 has a positive refractive power. The object-side surface S42 and the image-side surface S44 of the fourth lens 4 are aspheric surfaces, but the invention is not limited thereto.

The fifth lens 5 is a plastic aspheric lens. The fifth lens 5 has a positive refractive power. The object-side surface S52 and the image-side surface S54 of the fifth lens 5 are aspheric surfaces, but the invention is not limited thereto.

The infrared filter I, which is disposed on one side of the second lens group G2 away from the first lens group G1, may pass the light within a wavelength range of about 360 nm to 689 nm (visible light) and block more than 97% of the light within a wavelength range of 690 nm to 750 nm.

The cover plate CG may be a plate made of any suitable light-transmissive material, such as glass. The cover plate CG may function to adjust the optical path length and protect the imaging lens.

In this embodiment, the imaging lens 10b consists essentially of five lenses with refractive powers. In the second embodiment of the imaging lens 10b, an effective focal length (EFL) is 3.2 mm, an F-number (F #) is 2.0, a diagonal field of view (DFOV) is 128 degrees, a total track length (TTL) is 18.5 mm, and a maximum image height is 3.38 mm. The total track length is the distance measure along the optical axis OA from the object-side surface S12 of the first lens 1 to the image plane IMS of the imaging lens 10b.

In this embodiment, a lens diameter (outer diameter) D1 of the first lens 1 is 14 mm, a lens diameter DL of the fourth lens 4 is 11.3 mm, and an overall lens length LT is 12.9 mm, where the overall lens length is the distance measure along the optical axis OA between two outermost lens surfaces at opposite ends of the optical lens (e.g., between the object-side surface S12 of the first lens 1 and the image-side surface S44 of the fourth lens 4). Therefore, D1/LT=1.08, DL/LT=0.88 and EFL/LT=0.25.

Detailed optical data of the imaging lens 10b are shown in Table 3 below.

TABLE 3

| | Material | Shape | Radius (mm) | Interval/ Thickness (mm) | Refractive index | Abbe number | semi-aperture (mm) | Object |
|---|---|---|---|---|---|---|---|---|
| S12 | glass | spherical | 10.94 | 3.01 | 1.60 | 61 | 4.01 | first lens |
| S14 | | spherical | 2.03 | 1.67 | | | 2.10 | |
| S52 | plastic | aspheric | −8.29 | 2.04 | 1.66 | 20 | 2.00 | fifth lens |
| S54 | | aspheric | −5.21 | 0.69 | | | 1.77 | |
| AS | | | | 0.81 | | | 1.73 | aperture stop |
| S22 | glass | spherical | 13.20 | 1.65 | 1.62 | 63 | 1.90 | second lens |
| S24 | | spherical | −3.96 | 0.10 | | | 2.10 | |
| S32 | plastic | aspheric | 10.15 | 0.55 | 1.67 | 19 | 2.15 | third lens |
| S34 | | aspheric | 2.66 | 0.34 | | | 2.30 | |
| S42 | plastic | aspheric | 4.07 | 2.74 | 1.54 | 56 | 2.65 | fourth lens |
| S44 | | aspheric | −6.13 | 1.76 | | | 2.88 | |
| IS1 | glass | spherical | | 0.30 | 1.52 | 64 | 5.00 | infrared filter |
| IS2 | | spherical | | 2.49 | | | 5.00 | |
| CGS1 | glass | spherical | | 0.30 | 1.52 | 64 | 5.00 | cover |

TABLE 3-continued

| | Material | Shape | Radius (mm) | Interval/ Thickness (mm) | Refractive index | Abbe number | semi-aperture (mm) | Object |
|---|---|---|---|---|---|---|---|---|
| CGS2 | | spherical | | 0.05 | | | 5.00 | plate |
| IMS | | | | 0.00 | | | | image plane |

Table 4 shows aspheric surface data including the conic coefficient and 2i-th order aspheric coefficients of each aspheric surface of the imaging lens 10b.

TABLE 4

| | K | a4 | a6 | a8 | a10 | a12 | a14 | a16 |
|---|---|---|---|---|---|---|---|---|
| S52 | −31.52 | −9.72E−03 | 2.18E−03 | −7.17E−04 | 1.88E−04 | −2.94E−05 | 1.94E−06 | 0.00E+0 |
| S54 | 0.80 | −1.08E−01 | 1.77E−03 | 7.17E−02 | −7.26E−02 | 3.82E−02 | −1.03E−02 | 1.11E−03 |
| S32 | −99.00 | −4.60E−03 | 3.44E−03 | −1.43E−03 | 2.90E−04 | −3.09E−05 | 1.43E−06 | −1.43E−08 |
| S34 | −3.22 | −8.80E−03 | 6.25E−03 | −1.99E−03 | 3.56E−04 | −3.36E−05 | 1.27E−06 | 0.00E+0 |
| S42 | −1.27 | −1.23E−02 | 2.60E−03 | −4.51E−04 | 5.13E−05 | −2.65E−06 | 4.08E−08 | 0.00E+0 |
| S44 | 0.67 | −1.55E−03 | −6.83E−05 | 1.17E−05 | 1.43E−06 | −5.52E−07 | 4.90E−08 | 0.00E+0 |

The detailed numerical values of optical data of the imaging lens 10b are summarized in Table 9.

Figure 4A:
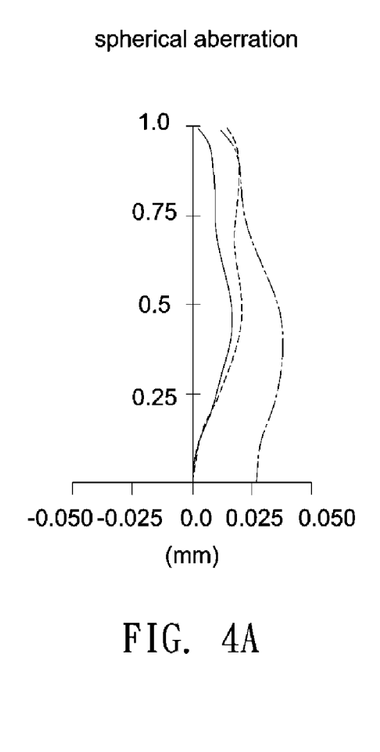
FIGS. 4A, 4B and 4C show longitudinal spherical aberration curves, astigmatic field curves and a distortion curve of the imaging lens illustrated in FIG. 3.
Figure 4B:
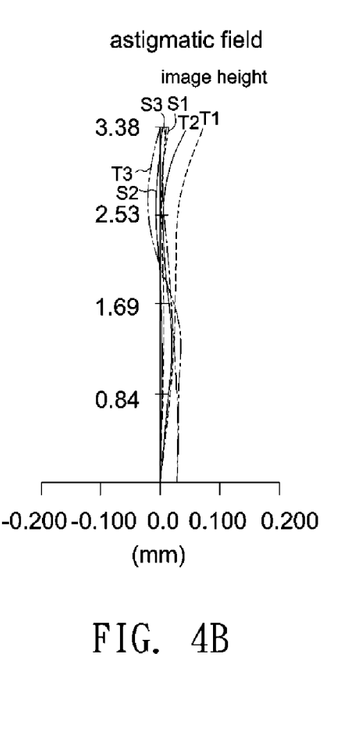
Figure 4C:
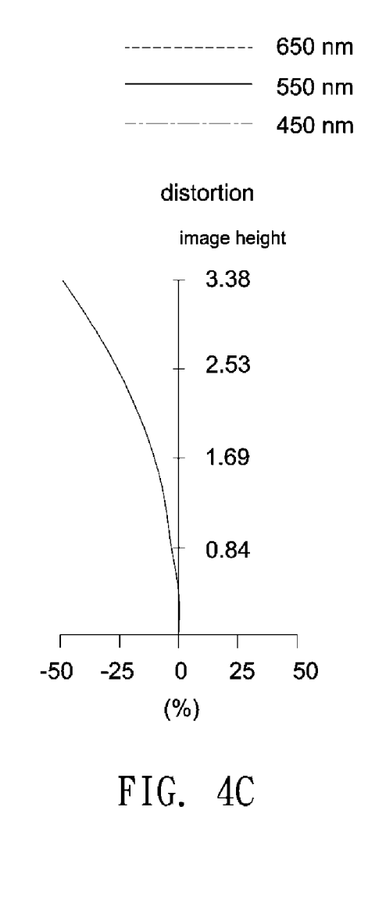

FIGS. 4A, 4B and 4C show longitudinal spherical aberration curves, astigmatic field curves and a distortion curve of the imaging lens 10b measured at wavelengths of 450 nm, 550 nm, and 650 nm. FIG. 4A shows the field curvature aberration measured at these wavelengths falls within +0.05 mm over the entire field of view. FIG. 4B shows the field curvature aberration measured at these wavelengths falls within +0.1 mm over the entire image height. Therefore, the imaging lens 10b having wide viewing angles (DFOV=128 degrees), a large aperture (F-number=2.0), and a total track length of 18.5 mm may still provide good imaging quality.

Please refer to FIG. 4A to FIG. 4C. In the longitudinal spherical aberration scheme of FIG. 4A, the field curvature aberration representing the wavelength over the entire field of view falls within ±0.05 millimeters (mm). In the field curvature aberration scheme in FIG. 4B, the field curvature aberration representing the wavelength falls within ±0.1 millimeters (mm) over the entire height range. It can be seen that, under the conditions of having wide viewing angles with a diagonal field of view (DFOV) of 128 degrees, a large aperture with an f-number (F #) of 2.0, and a total track length (TTL) of 18.5 mm, this embodiment can still provide good imaging quality.

Figure 5:
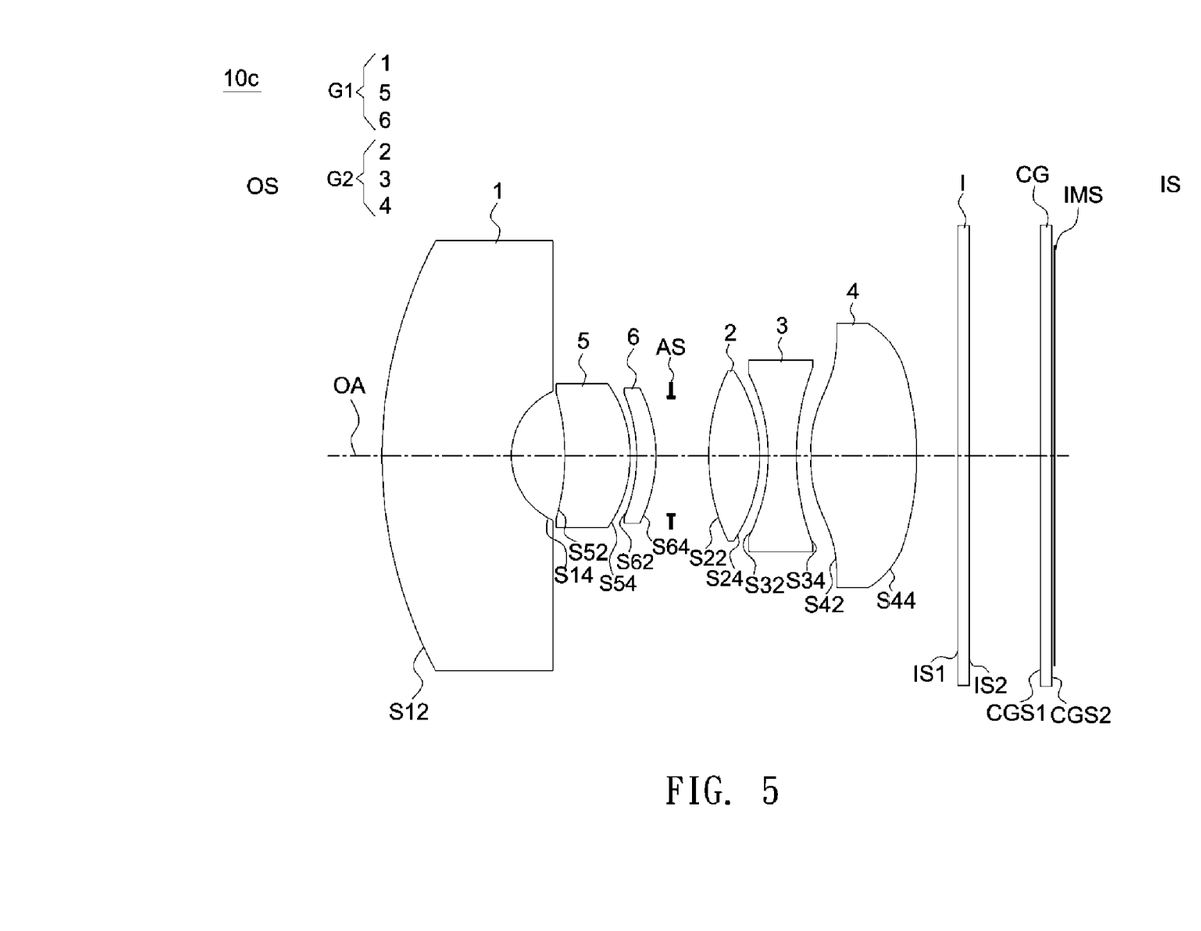
FIG. 5 is a schematic diagram of an imaging lens according to a third embodiment of the invention.

FIG. 5 is a schematic diagram of an imaging lens according to a third embodiment of the invention. Referring to FIG. 5, an imaging lens 10c includes, in order from an object side OS to an image side IS, a first lens 1, a fifth lens 5, a sixth lens 6 (the first lens 1, the fifth lens 5 and the sixth lens 6 constituting a first lens group G1), a second lens 2, a third lens 3, a fourth lens 4 (the second lens 2, the third lens 3 and the fourth lens 4 constituting a second lens group G2), an infrared filter I, a cover plate CG, and an aperture stop AS located between the first lens 1 and the second lens 2.

In this embodiment, the first lens 1, the fifth lens 5, the sixth lens 6, the second lens 2, the third lens 3, the fourth lens 4, the infrared filter I and the cover plate CG respectively have object-side surfaces S12, S52, S62, S22, S32, S42, IS1, CGS1 facing the object side OS and allowing imaging light beams to pass therethrough, and the first lens 1, the fifth lens 5, the sixth lens 6, the second lens 2, the third lens 3, the fourth lens 4, the infrared filter I and the cover plate CG respectively have image-side surfaces S14, S54, S64, S24, S34, S44, IS2, CGS2 facing the image side IS and allowing imaging light beams to pass therethrough.

In this embodiment, the first lens 1 is a glass spherical lens. The first lens 1 has a negative refractive power and is a meniscus lens, where the object-side surface S12 is convex, and the image-side surface S14 is concave. The object-side surface S12 and the image-side surface S14 of the first lens 1 are spherical surfaces, but the invention is not limited thereto.

The second lens 2 is a glass spherical lens. The second lens 2 has a positive refractive power. The object-side surface S22 and the image-side surface S24 of the second lens 2 are spherical surfaces, but the invention is not limited thereto.

The third lens 3 is a plastic aspheric lens. The third lens 3 has a negative refractive power. The object-side surface S32 and the image-side surface S34 of the third lens 3 are aspheric surfaces, but the invention is not limited thereto.

The fourth lens 4 is a plastic aspheric lens. The fourth lens 4 has a positive refractive power. The object-side surface S42 and the image-side surface S44 of the fourth lens 4 are aspheric surfaces, the object-side surface S42 of the fourth lens 4 has at least one inflection point, but the invention is not limited thereto.

The fifth lens 5 is a plastic aspheric lens. The fifth lens 5 has a positive refractive power. The object-side surface S52 and the image-side surface S54 of the fifth lens 5 are aspheric surfaces, but the invention is not limited thereto.

The sixth lens 6 is a plastic aspheric lens. The sixth lens 6 has a positive refractive power. The object-side surface S62 and the image-side surface S64 of the sixth lens 6 are aspheric surfaces, but the invention is not limited thereto.

The infrared filter I, which is disposed on one side of the second lens group G2 away from the first lens group G1, may pass the light within a wavelength range of about 360 nm to 689 nm (visible light) and block more than 97% of the light within a wavelength range of 690 nm to 750 nm.

The cover plate CG may be a plate made of any suitable light-transmissive material, such as glass. The cover plate CG may function to adjust the optical path length and protect the imaging lens.

In this embodiment, the imaging lens 10c consists essentially of five lenses with refractive powers. In the third embodiment of the imaging lens 10c, an effective focal length (EFL) is 3.19 mm, an F-number (F #) is 2.0, a diagonal field of view (DFOV) is 127.6 degrees, a total track length (TTL) is 18.5 mm, and a maximum image height is 3.378 mm. The total track length is the distance measure along the optical axis OA from the object-side surface S12 of the first lens 1 to the image plane IMS of the imaging lens 10c.

In this embodiment, a lens diameter (outer diameter) D1 of the first lens 1 is 16.68 mm, a lens diameter DL of the fourth lens 4 is 12.18 mm, and an overall lens length LT is 14.7 mm, where the overall lens length is the distance measure along the optical axis OA between two outermost lens surfaces at opposite ends of the optical lens (e.g., between the object-side surface S12 of the first lens 1 and the image-side surface S44 of the fourth lens 4). Therefore, D1/LT=1.13, DL/LT=0.83 and EFL/LT=0.22.

Detailed optical data of the imaging lens 10c are shown in Table 5 below.

Figure 6A:
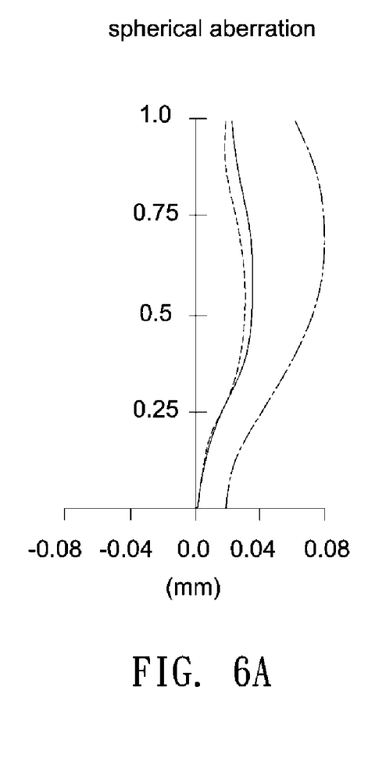
FIGS. 6A, 6B and 6C show longitudinal spherical aberration curves, astigmatic field curves and a distortion curve of the imaging lens illustrated in FIG. 5.
Figure 6B:
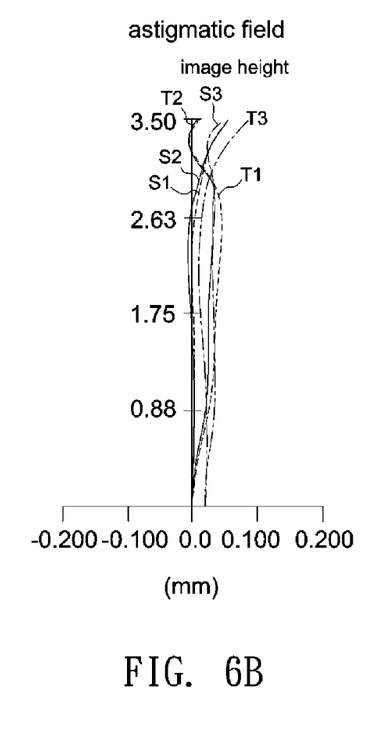
Figure 6C:
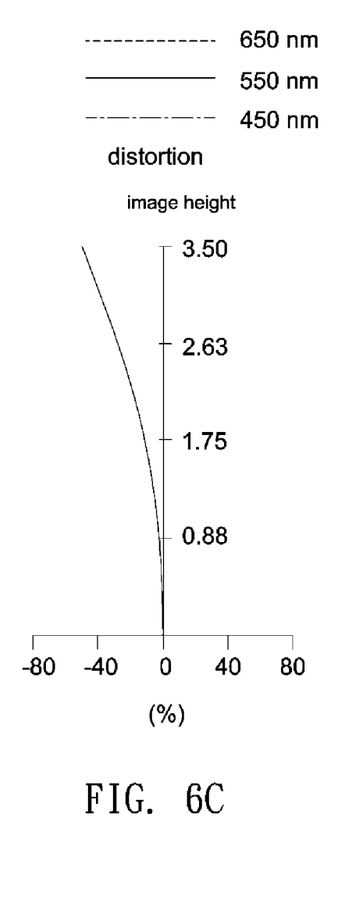

(DFOV=127.6 degrees), a large aperture (F-number=2.0), and a total track length of 18.5 mm may still provide good imaging quality.

Figure 7:
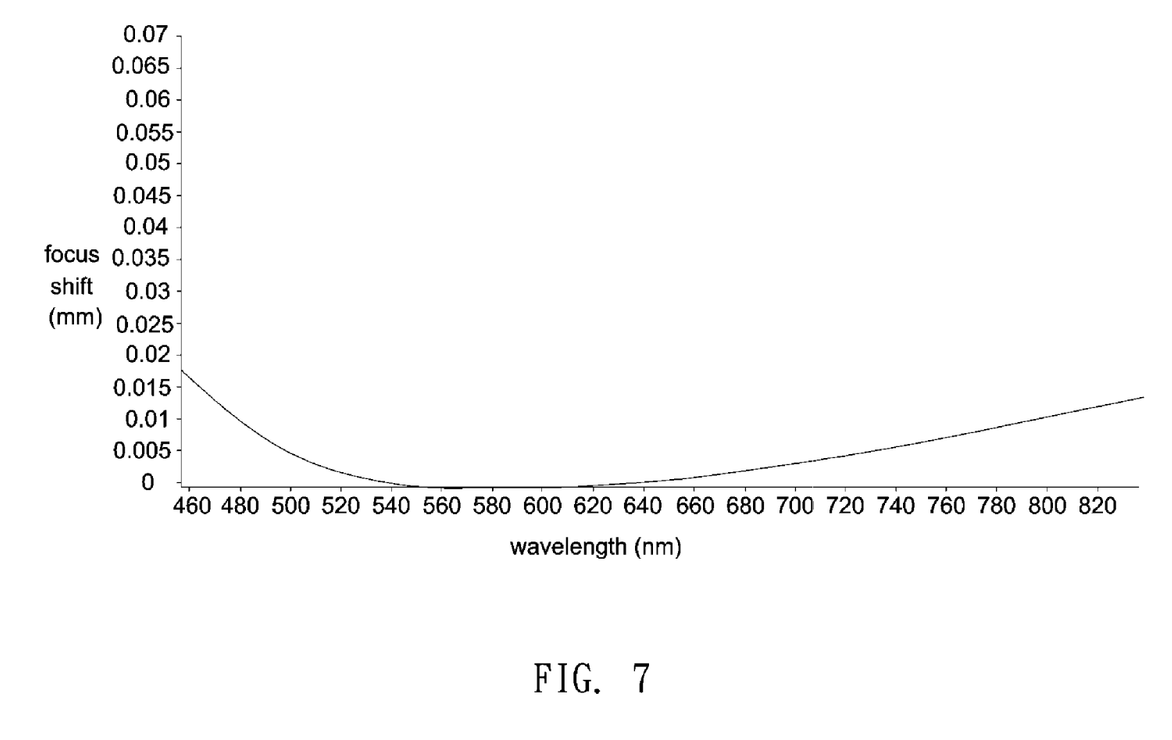
FIG. 7 is a focus shift diagram of the imaging lens shown in FIG. 5.

FIG. 7 is a focus shift diagram illustrating the focus shift of the imaging lens 10c measured at different wavelengths. In FIG. 7, the 550 nm visible light may pass the imaging lens 10c to form a first focal plane, the first focal plane may cross an optical axis of the imaging lens 10c to form a first intersection, the 850 nm infrared light may pass the imaging lens 10c to form a second focal plane, and the second focal plane may cross the optical axis of the imaging lens 10c to form a second intersection. A displacement between the first intersection and the second intersection is referred to as a focus shift. It can be clearly seen from FIG. 7 that the focus shift is smaller than 15 μm. The simulated results shown in FIG. 7 achieve a focus shift of less than 20 μm and thus are within permitted ranges specified by the standard, which

TABLE 5

|  | Material | Shape | Radius (mm) | Interval/ Thickness (mm) | Refractive index | Abbe number | semi- aperture (mm) | Object |
|---|---|---|---|---|---|---|---|---|
| S12 | glass | spherical | 12.98 | 3.52 | 1.77 | 49.62 | 5.42 | first lens |
| S14 |  | spherical | 1.93 | 1.47 |  |  | 1.80 |  |
| S52 | plastic | aspheric | −12.33 | 1.84 | 1.54 | 55.71 | 1.79 | fifth lens |
| S54 |  | aspheric | −6.87 | 0.10 |  |  | 1.79 |  |
| S62 | plastic | aspheric | −34.92 | 0.58 | 1.66 | 20.36 | 1.63 | sixth lens |
| S64 |  | aspheric | −6.59 | 0.38 |  |  | 1.68 |  |
| AS |  |  |  | 1.10 |  |  | 1.57 |  |
| S22 | glass | spherical | 5.54 | 1.38 | 1.61 | 60.61 | 2.10 | second |
| S24 |  | spherical | −4.41 | 0.27 |  |  | 2.15 | lens |
| S32 | plastic | aspheric | −6.06 | 0.76 | 1.66 | 20.36 | 2.10 | third lens |
| S34 |  | aspheric | 5.04 | 0.42 |  |  | 2.40 |  |
| S42 | plastic | aspheric | 3.41 | 2.89 | 1.54 | 55.71 | 2.90 | fourth |
| S44 |  | aspheric | −10.57 | 1.18 |  |  | 3.32 | lens |
| IS1 | glass |  |  | 0.30 | 1.52 | 64.14 | 5.78 | infrared |
| IS2 |  |  |  | 1.92 |  |  | 5.78 | filter |
| CGS1 | glass |  |  | 0.30 | 1.52 | 64.14 | 5.78 | cover |
| CGS2 |  |  |  | 0.09 |  |  | 5.78 | plate |
| IMS |  |  |  | 0.00 |  |  |  | image plane |

Table 6 shows aspheric surface data including the conic coefficient and 2i-th order aspheric coefficients of each aspheric surface of the imaging lens 10c.

indicates the above embodiment of imaging lens 10c may achieve good imaging quality and 24-hours confocal image-capturing capability.

TABLE 6

|  | K | a4 | a6 | a8 | a10 | a12 | a14 | a16 |
|---|---|---|---|---|---|---|---|---|
| S52 | −6.33 | −7.20E−03 | −1.08E−03 | 4.45E−04 | −1.27E−04 | 1.73E−20 | 0.00E+00 | 0.00E+00 |
| S54 | 2.66 | −2.88E−02 | 2.19E−03 | 6.95E−05 | −1.92E−05 | 2.75E−20 | 0.00E+00 | 0.00E+00 |
| S62 | 0.00 | −2.55E−02 | −5.82E−04 | −9.16E−04 | 2.86E−04 | 2.16E−20 | 0.00E+00 | 0.00E+00 |
| S64 | −19.84 | −1.37E−02 | −1.92E−03 | −2.93E−04 | 1.29E−04 | 2.42E−20 | 0.00E+00 | 0.00E+00 |
| S32 | 4.87 | −4.14E−04 | −3.85E−04 | 3.20E−05 | 1.31E−05 | 0.00E+00 | 0.00E+00 | 0.00E+00 |
| S34 | −11.84 | 2.77E−03 | −5.50E−04 | 1.16E−04 | −7.44E−06 | 1.59E−19 | 0.00E+00 | 0.00E+00 |
| S42 | −5.51 | 5.04E−04 | −3.48E−04 | 3.23E−05 | −1.99E−06 | 8.80E−20 | 0.00E+00 | 0.00E+00 |
| S44 | 0.00 | −1.39E−03 | −3.64E−04 | 8.07E−05 | −1.22E−05 | 8.95E−07 | −2.77E−08 | 0.00E+00 |

The detailed numerical values of optical data of the imaging lens 10c are summarized in Table 9.

FIGS. 6A, 6B and 6C show longitudinal spherical aberration curves, astigmatic field curves and a distortion curve of the imaging lens 10c measured at wavelengths of 450 nm, 550 nm, and 650 nm. FIG. 6A shows the field curvature aberration measured at these wavelengths falls within +0.08 mm over the entire field of view. FIG. 6B shows the field curvature aberration measured at these wavelengths falls within +0.1 mm over the entire image height. Therefore, the imaging lens 10b having wide viewing angles FIG. 8 is a schematic diagram of an imaging lens according to a fourth embodiment of the invention.

Figure 8:
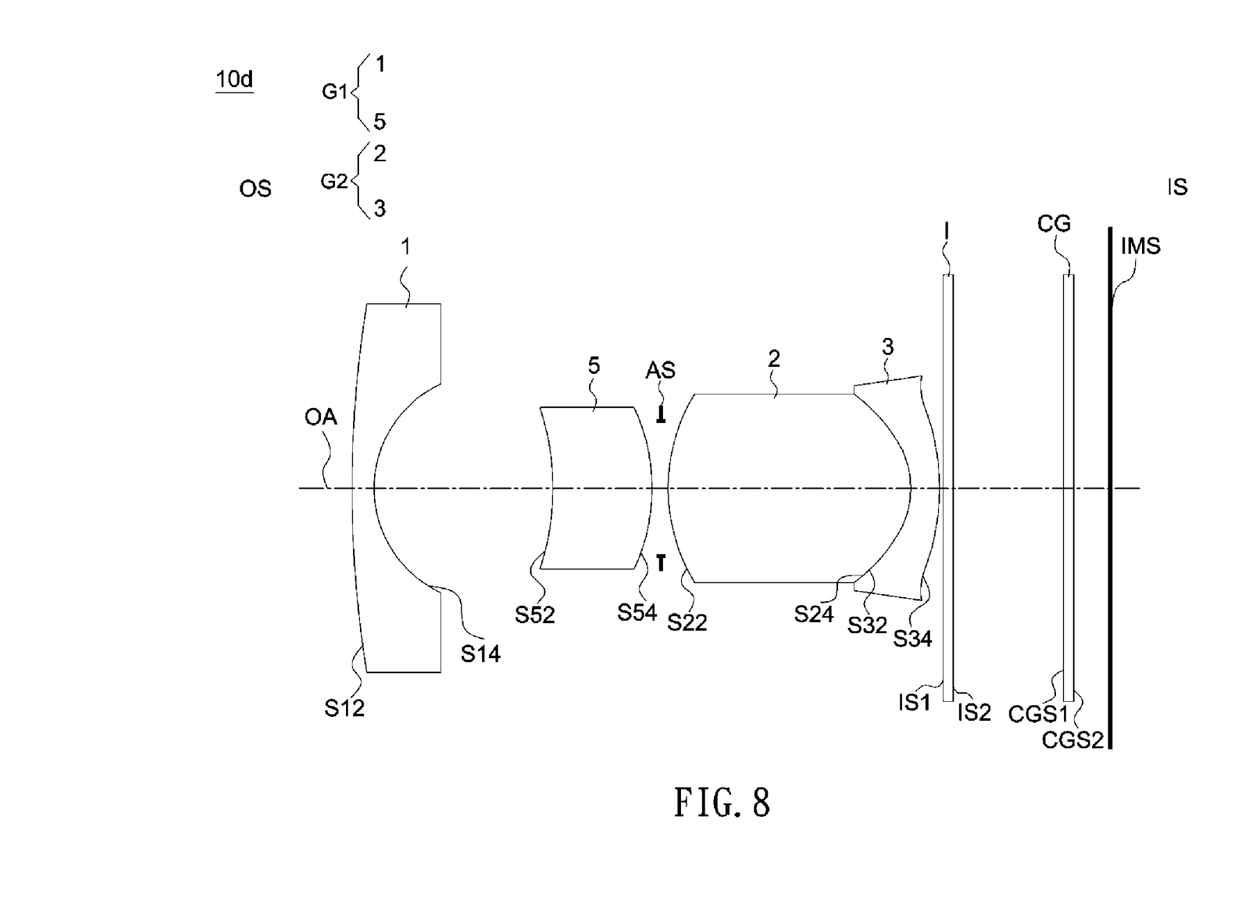
FIG. 8 is a schematic diagram of an imaging lens according to a fourth embodiment of the invention.

Referring to FIG. 8, an imaging lens 10d includes, in order from an object side OS to an image side IS, a first lens 1 and a fifth lens 5 (the first lens 1 and the fifth lens 5 constituting a first lens group G1), a second lens 2, a third lens 3 (the second lens 2 and the third lens 3 constituting a second lens group G2), an infrared filter I, a cover plate CG, and an aperture stop AS located between the first lens 1 and the second lens 2. The aperture stop AS is a light-blocking element that limits the amount of light passing through the imaging lens 10d. Light from a subject to be captured may enter the imaging lens 10d and pass through the first lens 1, the fifth lens 5, the aperture stop AS, the second lens 2, the third lens 3, the infrared filter I and the cover plate CG in succession, and finally forms an image on an image plane IMS. The object side OS is the side provided with the subject to be captured, and the image-side IS is the side provided with the image plane IMS.

In this embodiment, the first lens 1, the fifth lens 5, the second lens 2, the third lens 3, the infrared filter I and the cover plate CG respectively have object-side surfaces S12, S52, S22, S32, IS1, CGS1 facing the object side OS and allowing imaging light beams to pass therethrough, and the first lens 1, the fifth lens 5, the second lens 2, the third lens 3, the infrared filter I and the cover plate CG respectively have image-side surfaces S14, S54, S24, S34, IS2, CGS2 facing the image side IS and allowing imaging light beams to pass therethrough.

In detail, In this embodiment, the first lens 1 is a glass spherical lens. The first lens 1 has a negative refractive power and is a meniscus lens, where the object-side surface S12 is convex, and the image-side surface S14 is concave. The object-side surface S12 and the image-side surface S14 of the first lens 1 are spherical surfaces, but the invention is not limited thereto.

The fifth lens 5 is a glass spherical lens. The fifth lens 5 has a positive refractive power. The object-side surface S52 and the image-side surface S54 of the fifth lens 5 are spherical surfaces, but the invention is not limited thereto.

The second lens 2 is a plastic aspheric lens. The second lens 2 has a positive refractive power. The object-side surface S22 and the image-side surface S24 of the second lens 2 are aspheric surfaces, but the invention is not limited thereto.

The third lens 3 is a plastic aspheric lens. The third lens 3 has a negative refractive power. The object-side surface S32 and the image-side surface S34 of the third lens 3 are aspheric surfaces, but the invention is not limited thereto. In this embodiment, the image-side surface S24 of the second lens 2 and the object-side surface S32 of the third lens 3 are connected with each other to form a compound lens, such as being cemented to each other to form a cemented lens, but the invention is not limited thereto.

The infrared filter I, which is disposed on one side of the second lens group G2 away from the first lens group G1, may pass the light within a wavelength range of about 360 nm to 689 nm (visible light) and block more than 97% of the light within a wavelength range of 690 nm to 750 nm.

The cover plate CG may be a plate made of any suitable light-transmissive material, such as glass. The cover plate CG may function to adjust the optical path length and protect the imaging lens.

In this embodiment, the imaging lens 10d consists essentially of four lenses with refractive powers. In the fourth embodiment of the imaging lens 10d, an effective focal length (EFL) is 2.81 mm, an F-number (F #) is 2.0, a diagonal field of view (DFOV) is 129.9 degrees, a total track length (TTL) is 19.5 mm, and a maximum image height is 2.92 mm. The total track length is the distance measure along the optical axis OA from the object-side surface S12 of the first lens 1 to the image plane IMS of the imaging lens 10d.

In this embodiment, a lens diameter (outer diameter) D1 of the first lens 1 is 14.96 mm, a lens diameter DL of the third lens 3 is 11.34 mm, and an overall lens length LT is 15.12 mm, where the overall lens length is the distance measure along the optical axis OA between two outermost lens surfaces at opposite ends of the optical lens (e.g., between the object-side surface S12 of the first lens 1 and the image-side surface S34 of the third lens 3). Therefore, D1/LT=0.99, DL/LT=0.75 and EFL/LT=0.19.

Detailed optical data of the imaging lens 10d are shown in Table 7 below.

TABLE 7

| | Material | Shape | Radius (mm) | Interval/ Thickness (mm) | Refractive index | Abbe number | semi-aperture (mm) | Object |
|---|---|---|---|---|---|---|---|---|
| S12 | glass | spherical | 38.85 | 0.50 | 1.64 | 61 | 4.32 | first lens |
| S14 | | spherical | 2.90 | 4.62 | | | 2.65 | |
| S52 | glass | spherical | −6.03 | 2.57 | 1.75 | 52 | 1.89 | aperture stop |
| S54 | | spherical | −5.02 | 0.10 | | | 1.88 | second lens |
| AS | | | | 0.29 | | | 1.70 | |
| S22 | plastic | aspheric | 4.55 | 6.30 | 1.54 | 57 | 2.18 | third lens |
| S24 | | aspheric | −2.11 | 0.01 | | | 2.43 | |
| S32 | plastic | aspheric | −2.11 | 0.75 | 1.66 | 20 | 2.43 | fourth lens |
| S34 | | aspheric | −5.27 | 0.10 | | | 2.63 | |
| IS1 | | | | 0.30 | | | 5.00 | infrared filter |
| IS2 | | | | 2.73 | | | 5.00 | |
| CGS1 | | | | 0.30 | | | 5.00 | cover plate |
| CGS2 | | | | 0.95 | | | 5.00 | |
| IMS | | | | 0.00 | | | 3.16 | image plane |

Table 8 shows aspheric surface data including the conic coefficient and 2i-th order aspheric coefficients of each aspheric surface of the imaging lens 10d.

TABLE 8

| | K | a4 | a6 | a8 | a10 | a12 | a14 | a16 |
|---|---|---|---|---|---|---|---|---|
| S32 | −0.09 | −3.55E−04 | −5.12E−04 | 6.01E−04 | −3.55E−04 | 1.11E−04 | −1.77E−05 | 1.12E−06 |
| S34 | −0.35 | −3.22E−03 | −2.99E−03 | 3.04E−03 | −7.54E−04 | 1.23E−04 | −1.33E−05 | 7.56E−07 |

TABLE 8-continued

|     | K      | a4        | a6        | a8        | a10       | a12       | a14       | a16       |
|-----|--------|-----------|-----------|-----------|-----------|-----------|-----------|-----------|
| S42 | −0.35  | −3.22E−03 | −2.99E−03 | 3.04E−03  | −7.54E−04 | 1.23E−04  | −1.33E−05 | 7.56E−07  |
| S44 | −18.81 | −1.42E−02 | 4.18E−03  | −9.53E−04 | 1.99E−04  | −2.85E−05 | 2.33E−06  | −7.97E−08 |

The imaging lens 10d according to the above embodiment has at least the following advantages. First, the first lens 1 and the fifth lens 5 are both glass lenses with high light transmittance to improve imaging quality and with high hardness to enhance wear resistance. Besides, the relatively low thermal expansion coefficient of a glass lens is allowed to reduce thermal drift of the imaging lens 10d and thus enhance imaging quality. In addition, the imaging lens 10d includes two aspheric lenses to improve imaging resolution. Besides, the second lens 2 and the third lens 3 are cemented to form a cemented lens to correct chromatic aberrations and achieve higher manufacturing tolerances to thereby increase production yields.

The detailed numerical values of optical data of the imaging lens 10d are summarized in Table 9.

Table 9 lists relevant numerical values of the imaging lens 10a-10d in the first to the fourth embodiments. Among them, the items "EFL", "TTL", "LT", "Image Height", "D1" and "DL" are measured in millimeters (mm), and the unit of the item "DFOV" is degree.

TABLE 9

|              | First embodiment | Second embodiment | Third embodiment | Fourth embodiment |
|--------------|------------------|-------------------|------------------|-------------------|
| EFL          | 2.76             | 3.20              | 3.19             | 2.81              |
| F#           | 2.0              | 2.0               | 2.0              | 2.0               |
| DFOV         | 128.8            | 128.0             | 127.6            | 129.9             |
| TTL          | 18.51            | 12.90             | 18.50            | 19.50             |
| Image Height | 2.92             | 3.38              | 3.38             | 2.92              |
| D1           | 15.51            | 14.00             | 16.68            | 14.96             |
| DL           | 10.97            | 11.30             | 12.18            | 11.34             |
| LT           | 13.09            | 12.90             | 14.70            | 15.12             |
| D1/LT        | 1.18             | 1.08              | 1.13             | 0.99              |
| DL/LT        | 0.84             | 0.88              | 0.83             | 0.75              |
| EFL/LT       | 0.21             | 0.25              | 0.22             | 0.19              |

Figure 9A:
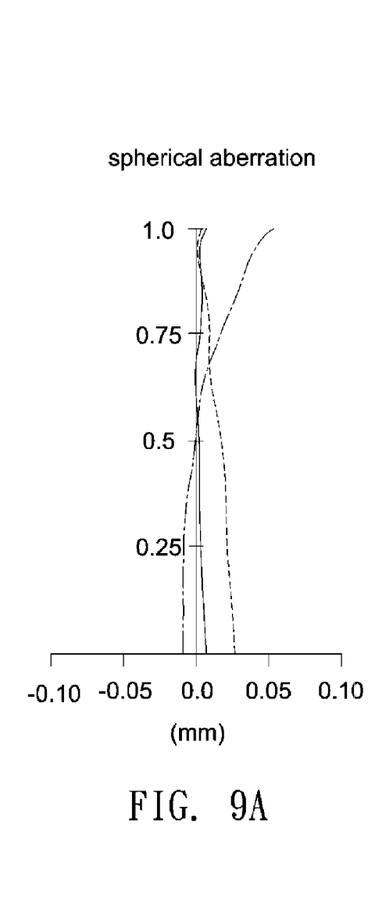
FIGS. 9A, 9B and 9C show longitudinal spherical aberration curves, astigmatic field curves and a distortion curve of the imaging lens illustrated in FIG. 8.
Figure 9B:
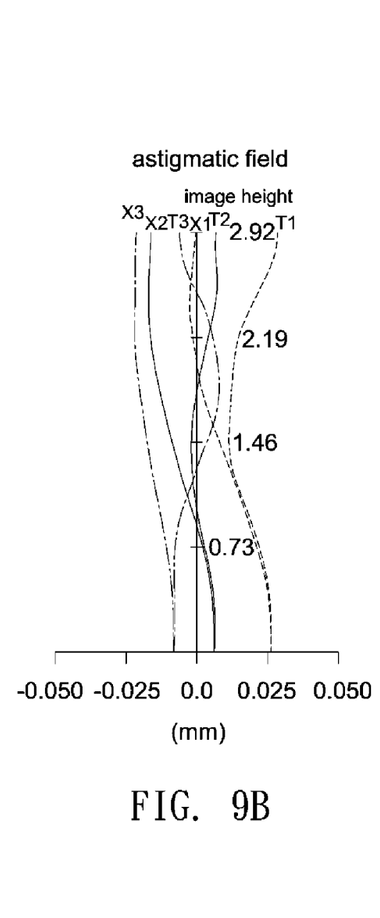
Figure 9C:
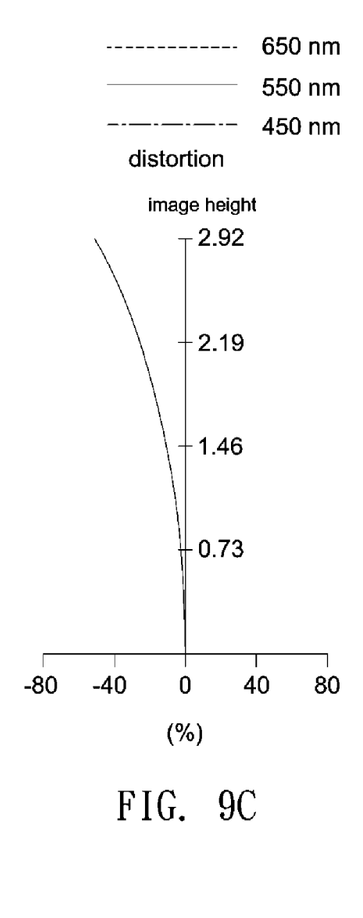

FIGS. 9A, 9B and 9C show longitudinal spherical aberration curves, astigmatic field curves and a distortion curve of the imaging lens 10d measured at wavelengths of 450 nm, 550 nm, and 650 nm. FIG. 9A shows the field curvature aberration measured at these wavelengths falls within ±0.05 mm over the entire field of view. FIG. 9B shows the field curvature aberration measured at these wavelengths falls within ±0.05 mm over the entire image height. Therefore, the imaging lens 10b having wide viewing angles (DFOV=129.9 degrees), a large aperture (F-number=2.0), and a total track length of 19.5 mm may still provide good imaging quality.

According to the above embodiments, meeting the designed characteristics and arrangement of optical components set forth in the above may achieve good imaging quality, 24-hours confocal image-capturing capability and a miniaturized assembly under the condition of a wide field of view and a large effective aperture. Further, in various embodiments of the invention, the glass/plastic lenses and spherical/aspheric lenses are well matched to achieve a wide range of operating temperature, low fabrication costs and improved imaging quality.

Though the embodiments of the invention have been presented for purposes of illustration and description, they are not intended to be exhaustive or to limit the invention. Accordingly, many modifications and variations without departing from the spirit of the invention or essential characteristics thereof will be apparent to practitioners skilled in this art. It is intended that the scope of the invention be defined by the claims appended hereto and their equivalents in which all terms are meant in their broadest reasonable sense unless otherwise indicated.

What is claimed is:

1. An imaging lens, comprising:
a first lens group comprising at least one and at most three lenses with refractive powers;
a second lens group, the second lens group having a positive refractive power and comprising at least two and at most three lenses with refractive powers; and
an aperture stop disposed between the first lens group and the second lens group;
wherein a lens closest to an object side in the first lens group is made of glass, and the imaging lens satisfies conditions of 2 mm<LT<20 mm, 0.6<DL/LT<1 and 0.8<D1/LT<1.4, where D1 is a lens diameter of the lens closest to the object side, DL is a lens diameter of a lens farthest from the object side in the second lens group, and LT is distance along the optical axis between two outermost lens surfaces at opposite ends of the first lens group and the second lens group.

2. The imaging lens as claimed in claim 1, further comprising an infrared filter disposed on a side of the second lens group away from the first lens group, wherein the infrared filter is configured to block more than 97% of light within a wavelength range of 690 nm to 750 nm.

3. The imaging lens as claimed in claim 1, wherein the first lens group comprises a spherical lens.

4. The imaging lens as claimed in claim 1, wherein the second lens group comprises at least two aspheric lenses.

5. The imaging lens as claimed in claim 1, wherein an object-side surface of the lens farthest from the object side in the second lens group has at least one inflection point.

6. The imaging lens as claimed in claim 1, wherein the imaging lens satisfies a condition of 0.14<EFL/LT<0.4, where EFL is an effective focal length of the imaging lens.

7. An imaging lens, comprising:
a first lens group comprising at least one and at most three lenses with refractive powers;
a second lens group, the second lens group having a positive refractive power and comprising at least two and at most three lenses with refractive powers; and
an aperture stop disposed between the first lens group and the second lens group;
wherein a lens closest to an object side in the first lens group is made of glass, a diagonal field of view of the imaging lens ranges from 120 degrees to 140 degrees, and the imaging lens satisfies conditions of 2 mm<LT<20 mm and 0.8<D1/LT<1.4, where D1 is a lens diameter of the lens closest to the object side, and LT is distance along the optical axis between two outermost lens surfaces at opposite ends of the first lens group and the second lens group.

8. The imaging lens as claimed in claim 7, wherein a first focal plane formed by 550 nm light passing through the imaging lens forms a first intersection with an optical axis of the imaging lens, a second focal plane formed by 850 nm light passing through the imaging lens forms a second intersection with the optical axis, and a distance between the first intersection and the second intersection is less than 20 μm.

9. The imaging lens as claimed in claim 7, wherein the first lens group comprises a spherical lens.

10. The imaging lens as claimed in claim 7, the second lens group comprises at least two aspheric lenses.

11. The imaging lens as claimed in claim 7, wherein the imaging lens satisfies a condition of 0.14<EFL/LT<0.4, where EFL is an effective focal length of the imaging lens.

12. An imaging lens, comprising:
- a first lens, a second lens, a third lens, and a fourth lens with refractive powers arranged in order from an object side to an image side;
- an aperture stop disposed between the first lens and the second lens; and
- an infrared filter disposed on a side of the fourth lens away from the first lens and configured to block more than 97% of light within a wavelength range of 690 nm to 750 nm;
- wherein the first lens is made of glass, and the imaging lens satisfies conditions of 2 mm<LT<20 mm, 0.8<D1/LT<1.4 and 0.6<DL/LT<1, where D1 is a lens diameter of the first lens, DL is a lens diameter of the fourth lens, and LT is distance along the optical axis between an object-side surface of the first lens and an image-side surface of the fourth lens.

13. The imaging lens as claimed in claim 12, further comprising a fifth lens disposed between the first lens and the aperture stop.

14. The imaging lens as claimed in claim 13, further comprising a sixth lens disposed between the fifth lens and the aperture stop.

15. The imaging lens as claimed in claim 14, wherein the sixth lens has a positive refractive power.

16. The imaging lens as claimed in claim 12, wherein the imaging lens satisfies a condition of 0.14<EFL/LT<0.4, where EFL is an effective focal length of the imaging lens.

17. The imaging lens as claimed in claim 12, wherein an object-side surface of the fourth lens has at least one inflection point.

18. The imaging lens as claimed in claim 12, wherein a first focal plane formed by 550 nm light passing through the imaging lens forms a first intersection with an optical axis of the imaging lens, a second focal plane formed by 850 nm light passing through the imaging lens forms a second intersection with the optical axis, and a distance between the first intersection and the second intersection is less than 20 μm.

19. The imaging lens as claimed in claim 12, wherein the first lens, the second lens, the third lens and the fourth lens respectively have negative, positive, negative and positive refractive powers.

20. The imaging lens as claimed in claim 12, wherein a diagonal field of view of the imaging lens ranges from 120 degrees to 140 degrees.

* * * * *